(12) United States Patent
Lindquist

(10) Patent No.: US 6,535,311 B1
(45) Date of Patent: Mar. 18, 2003

(54) WAVELENGTH SELECTIVE CROSS-CONNECT SWITCH USING A MEMS SHUTTER ARRAY

(75) Inventor: Robert G. Lindquist, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/458,560

(22) Filed: Dec. 9, 1999

(51) Int. Cl.$^7$ .................................................. H04J 14/02
(52) U.S. Cl. ....................... 359/128; 359/127; 359/117; 359/139; 359/130; 359/246; 359/494; 359/495; 359/497; 359/499
(58) Field of Search ................................ 359/127, 128, 359/130, 134, 122, 117, 139, 246, 494, 495, 497, 499; 385/11, 17, 18, 24, 16, 37

(56) References Cited

U.S. PATENT DOCUMENTS

| | | | |
|---|---|---|---|
| 5,414,540 A | 5/1995 | Patel et al. | |
| 5,742,712 A | 4/1998 | Pan et al. | |
| 5,960,133 A | 9/1999 | Tomlinson | |
| 5,974,207 A | 10/1999 | Aksyuk et al. | |
| 5,995,688 A | 11/1999 | Aksyuk et al. | |
| 6,055,344 A | * 4/2000 | Fouquet et al. | 385/16 |
| 6,097,859 A | * 8/2000 | Solgaard et al. | 385/17 |
| 6,148,124 A | * 11/2000 | Aksyuk | 385/24 |
| 6,192,172 B1 | * 2/2001 | Fatehi et al. | 385/17 |
| 6,205,267 B1 | * 3/2001 | Aksyuk et al. | 385/19 |
| 6,229,640 B1 | * 5/2001 | Zhang | 359/290 |
| 6,243,507 B1 | * 6/2001 | Goldstein et al. | 385/13 |
| 6,285,500 B1 | * 9/2001 | Ranalli et al. | 359/497 |

FOREIGN PATENT DOCUMENTS

| | | |
|---|---|---|
| EP | 0555778 A2 | 5/1993 |
| EP | 0 926 853 A2 | 12/1998 |
| EP | 0 961 150 A2 | 5/1999 |
| EP | 1052868 A2 | 3/2000 |
| JP | 2617054 | 6/1997 |
| WO | WO 99/21123 | 4/1999 |
| WO | WO 99/38348 | 7/1999 |

* cited by examiner

Primary Examiner—Leslie Pascal
Assistant Examiner—Hanh Phan
(74) Attorney, Agent, or Firm—Joanne N. Pappas

(57) ABSTRACT

A wavelength selective cross-connect switch for selectively switching wavelength-separated input channels between two optical input signals. The cross-connect switch includes two dispersive elements, where each dispersive element receives an optical input signal and disperses it into a plurality of wavelength-separated input channels. The cross-connect switch also includes a switching array mechanism, such as a micro-electro mechanical system (MEMS) shutter array, receiving the plurality of wavelength-separated input channels from each of the dispersive elements and operative for selectively switching one or more of the wavelength-separated input channels between the optical signals.

17 Claims, 4 Drawing Sheets

WAVELENGTH SELECTIVE CROSS-CONNECT SWITCH USING A MEMS SHUTTER ARRAY

BACKGROUND OF THE INVENTION

1. Field of the Invention

The present invention relates generally to wavelength selective cross-connect switches (WSXC), and particularly to WSXC switches using micro-electro mechanical system (MEMS) shutter arrays.

2. Technical Background

Communication networks increasingly rely upon optical fiber for high-speed, low-cost transmission. Optical fibers were originally envisioned as an optical replacement for electronic transmission media, such as high-speed coaxial cable and lower-speed twisted-pair cable. However, even high-speed optical fibers are limited by the electronics at the transmitting and receiving ends, generally rated at a few gigabits per second, although 40 Gbit/s systems have been prototyped. Such high-speed electronic systems are expensive and still do not fully exploit the inherent bandwidth of fiber-optic systems. On the other hand, communication networks comprised of only optical components offer many intrinsic advantages over systems that use electronics within any part of the principal transmission path.

Wavelength division multiplexing (WDM) is pervasive in optical communication systems. Generally, wavelength division multiplexing (WDM) electronically impresses different data signals upon different carrier frequencies, all of which are carried by a single optical fiber. Recent research and development has suggested that an all-optical network can be constructed having switching nodes that can switch the separate WDM channels (carrier frequencies) in different directions without the necessity of converting the optical signals to electronic signals. If such optical switching can be accomplished with simple optical components, a sophisticated optical network can be constructed at relatively low cost. Moreover, the high-speed electronics of the optical network can be confined to the system end terminals that require speeds of only the individual channels and not of the total throughput of the system.

SUMMARY OF THE INVENTION

One aspect of the present invention is an optical switch for selectively switching wavelength channels between two optical signals. The optical switch includes two dispersive elements, where each dispersive element receives an optical input signal and disperses it into a plurality of wavelength-separated input channels, and a micro-electro mechanical system (MEMS) shutter array receiving the plurality of wavelength-separated input channels from each of the dispersive elements and operative for selectively switching one or more of the wavelength-separated input channels between the optical signals.

Additional features and advantages of the invention will be set forth in the detailed description which follows, and in part will be readily apparent to those skilled in the art from that description or recognized by practicing the invention as described in the detailed descriptions which follows, the claims as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Figure 1:
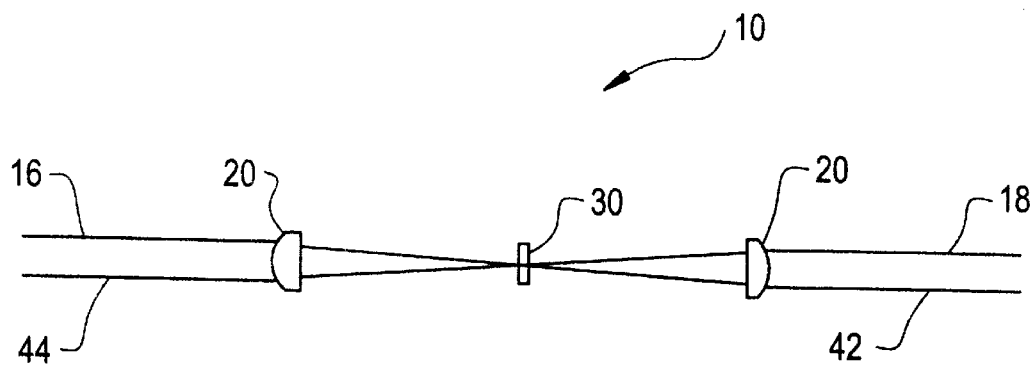
FIG. 1 is a top view of a wavelength selective cross-connect switch in accordance with the present invention.

Reference will now be made in detail to the presently preferred embodiments of the invention, examples of which are illustrated in the accompanying drawings. Whenever possible, the same reference numerals will be used throughout the drawings to refer to the same or like parts.

Figure 2:
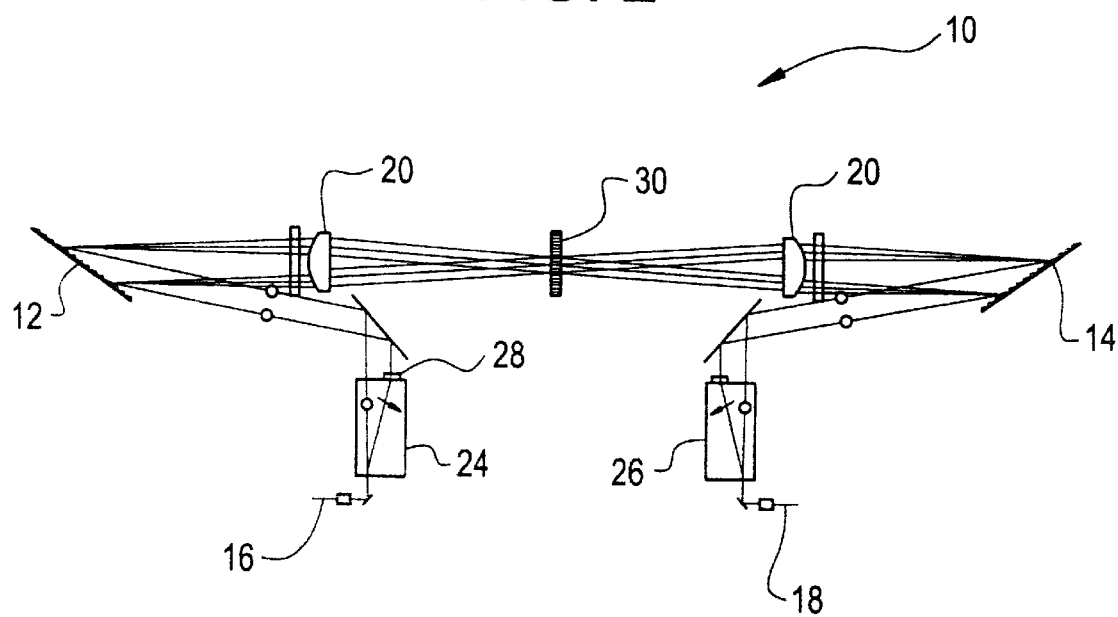
FIG. 2 is a side view of the wavelength selective cross-connect switch of the present invention.

An exemplary embodiment of a wavelength selective cross-connect (WSXC) switch 10 of the present invention is shown in FIGS. 1 and 2. The WSXC switch 10 includes two wavelength dispersive elements 12 and 14, and a switching array mechanism array 30 positioned between the two dispersive elements. Each dispersive element 12, 14 receives an optical signal and disperses it into a plurality of wavelength-separated input channels. The switching array mechanism 30 in turn receives the plurality of wavelength-separated input channels from each of the dispersive elements 12, 14, and is operative to selectively switch one or more of the wavelength-separated input channels between the optical signals.

More specifically, the first dispersive element 12 receives a first optical signal which is carried by a first input optic fiber 16, whereas the second dispersive element 14 receives a second optical signal which is carried by a second input optic fiber 18. Each optical signal strikes the corresponding dispersive element 12, 14, thereby spatially separating the optical signal into a plurality of wavelength-separated input channels. Although the dispersive elements 12, 14 are preferably diffraction gratings, other active or passive dispersive elements (e.g., a prism) may also be used in the present invention. As will be apparent to one skilled in the art, the number of input channels depends on the number of WDM signal components that are combined on the optical signal.

In addition, a focusing lens 20 is positioned between each dispersive element and the switching array mechanism 30. Each lens 20 focuses the wavelength-separated input beams onto the individual switching structures of the switching array mechanism 30.

Figure 3A:
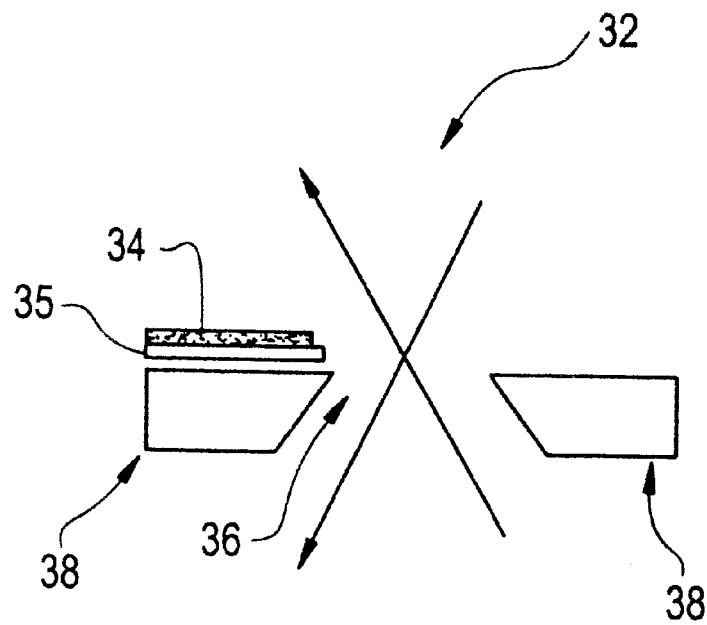
FIGS. 3A and 3B are fragmentary side views of a micro-electro mechanical system (MEMS) shutter array of the present invention illustrating the mirror element in a shutter closed position and shutter open position, respectively.
Figure 3B:
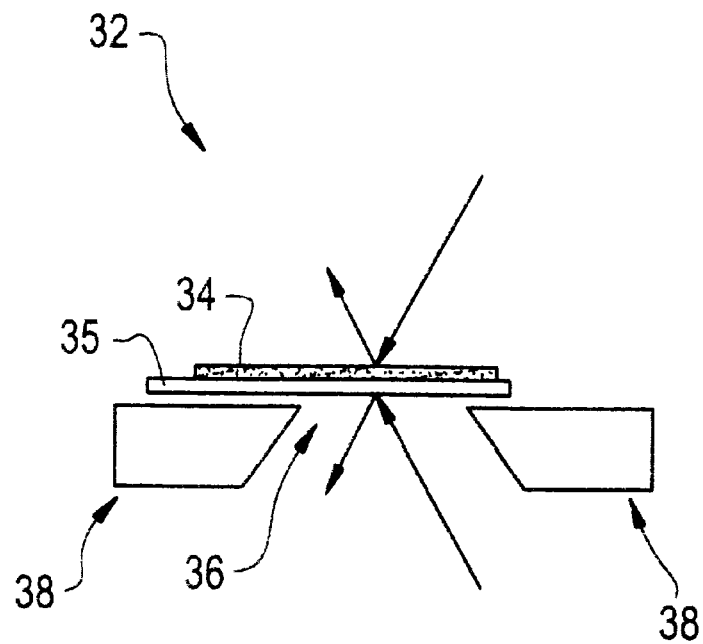

A preferred embodiment of the switching array mechanism 30 is a micro-electro mechanical system (MEMS) shutter array. The MEMS shutter array is constructed using a plurality of switching structures, such that each switching structure corresponds to one of the wavelength-separated input channels. An individual switching structure 32 is shown in FIGS. 3A and 3B. In this structure, a mirror 34 or other reflective element is suspended above an aperture 36 formed in a suitable substrate 38. In one embodiment, mirror 34 may be a layer of gold or other reflective material which is deposited onto one or both sides of a polysilicon member 35. The through aperture 36 is formed by etching the substrate 38 using deep ion etching, wet etching or some other known etching techniques. As will be apparent to one skilled in the art, the MEMS shutter array can otherwise be fabricated using either bulk or surface micro-machining techniques. Depending on channel separation and other design criteria for the optical system, each mirror 34 in the shutter array is spaced apart 50 to 200 μm (center to center).

In operation, the mirror 34 is laterally movable between an open shutter position (FIG. 3A) and a closed shutter position (FIG. 3B). In the open shutter position, each input beam passes through the aperture 36 of the switching structure as shown in FIG. 3A. Thus, the input beam passes to the corresponding output channel. For instance, the input beam from the first input optic fiber 16 passes to a first output optic fiber 42 and the input beam from the second input optic fiber 18 passes to a second output optic fiber 44 (FIG. 1). In the closed shutter position, both input beams are incident on the mirror 34 as shown in FIG. 3B. In this case, each input beam switches to the corresponding output channel in the other output optic fiber. As will be more fully described below, the actuation of the mirror 34 can be accomplished using a variety of micro-actuator devices.

Returning to FIG. 2, the output beams from the switching array mechanism 30 pass through the appropriate focusing lens 20. Each focusing lens 20 serves to recollimate the output beams. After traversing the focusing lens 20, each output beam strikes one of the dispersive elements 12 and 14. In this case, each dispersive element acts reciprocally to recombine the wavelength-separated output beams into a single output beam. Each output beam is in turn carried by either the first output optic fiber 42 or the second output optic fiber 44.

To minimize polarization dependant loss, the WSXC switch 10 of the present invention may optionally include polarization dispersive elements 24 and 26. One skilled in the art will readily recognize that the polarization dispersive elements 24, 26 serve to spatially separate the different polarization components of each input beam. Preferably, the polarization dispersive elements 24, 26 are a birefringent crystal (e.g., calcite) disposed along the optical path between the optical fibers 16, 18 and the wavelength dispersive elements 12, 14. To synchronize the polarization state, a half-wave plate 28 may also be incorporated into one of the polarization dispersive elements, such as element 24. As will be apparent to one skilled in the art, additional optical elements may be utilized for directing the input beams from the polarization components 24, 26 to the wavelength dispersive elements 12, 14.

Figure 4:
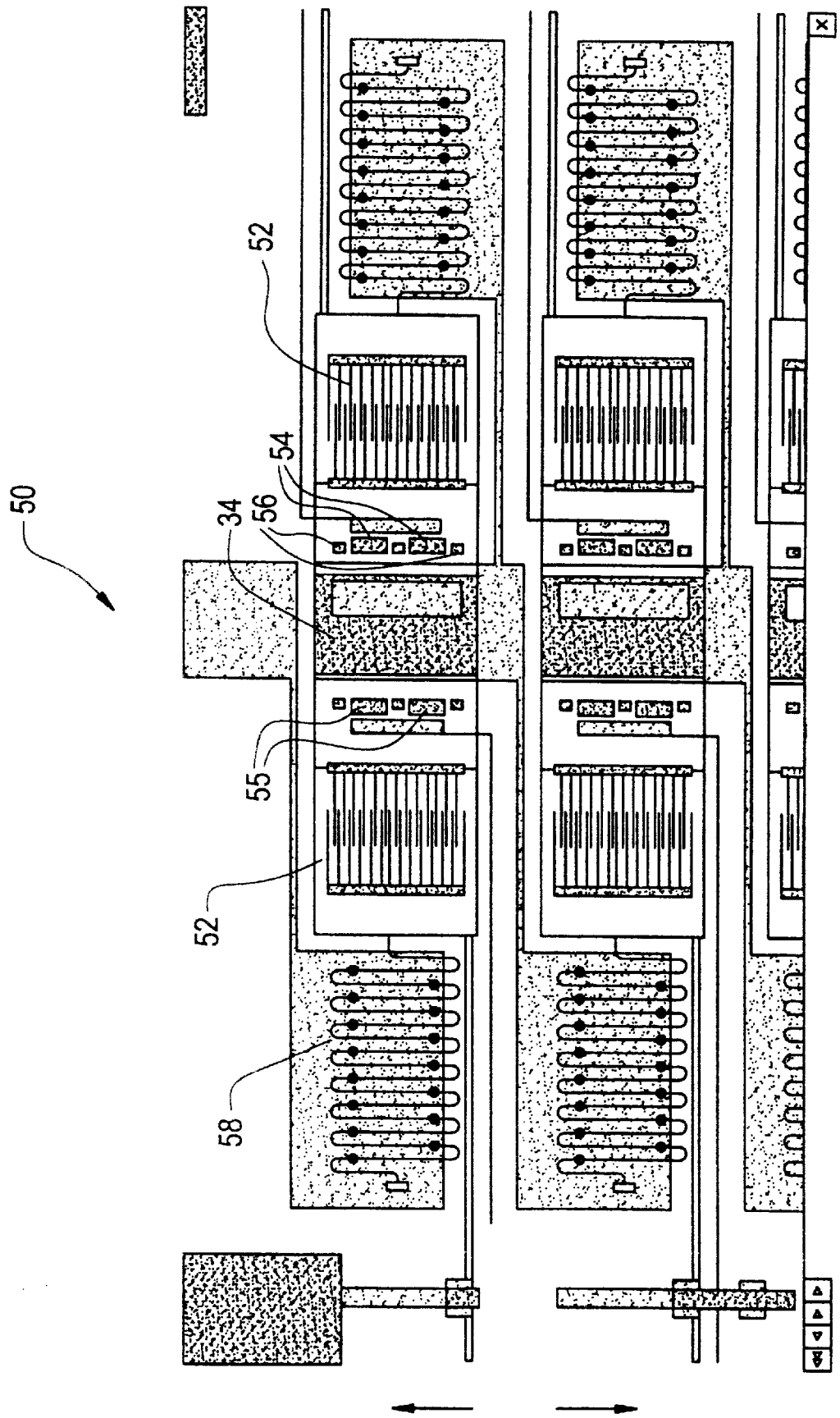
FIG. 4 is a diagram illustrating an exemplary resonant comb drive in conjunction with the MEMS shutter array of the present invention.
Figure 5:
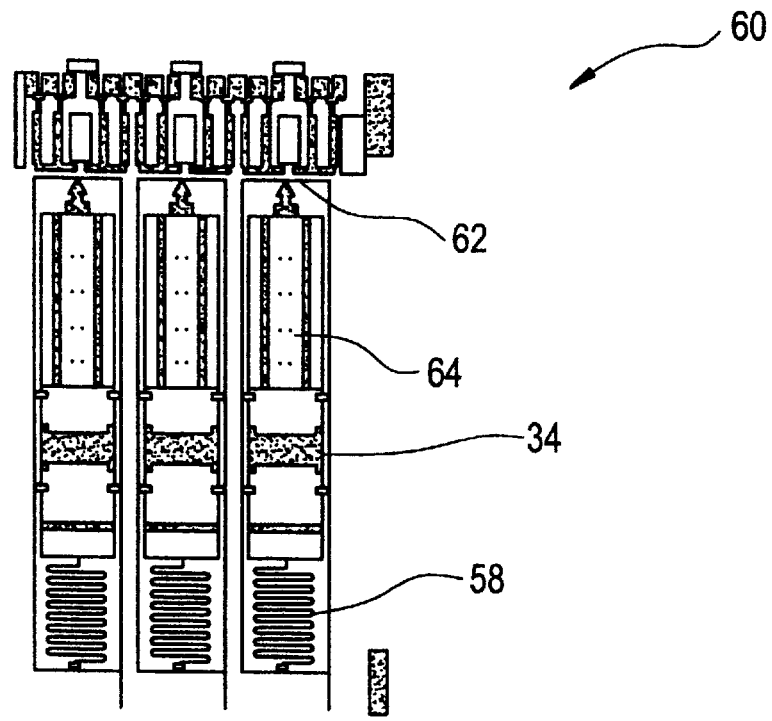
FIG. 5 is a diagram illustrating an exemplary thermal actuated drive in conjunction with the MEMS shutter array of the present invention.
Figure 6:
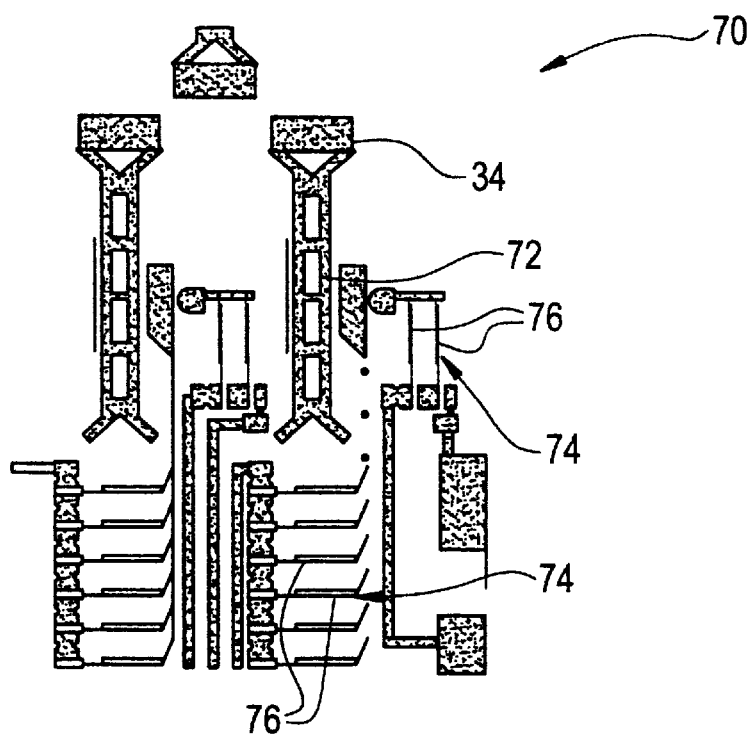
FIG. 6 is a diagram illustrating an exemplary scratch drive in conjunction with the MEMS shutter array of the present invention.

Exemplary micro-actuators for use in the MEMS shutter array of the present invention are illustrated in FIGS. 4–6. For example, a resonant comb actuator device 50 is shown in FIG. 4. In this embodiment, the mirror 34 is positioned between two comb drives 52. The resonant comb drives 52 provide the initial displacement of the mirror 34. A clamping voltage is then applied to one or more shutter stops 54 which are positioned between the mirror 34 and one of the comb drives 52. The clamping voltage attracts and holds the mirror 34 near the shutter stops 54, thereby actuating the mirror 34 to an open shutter position. To prevent a short circuit, stopping pillars 56 are positioned between the mirror 34 and the shutter stops 54. To actuate the mirror 34 to a closed shutter position, a clamping voltage is applied to the other set of shutter stops 55. As a result, the mirror 34 is displaced in the opposite direction using the energy stored in the springs 58. While the above description is provided with reference to a resonant comb actuator, it is readily understood that other types of electro-static actuator devices may also be suitable for use in the MEMS shutter array 30 of the present invention.

As shown in FIG. 5, a scratch drive device 60 is an alternative electro-static actuator device which may be used with the present invention. The scratch drive 60 includes a thermal-actuated latch 62 connected to the mule train 64 of the scratch drive. A suitable mirror 34 as disclosed above is connected to the mule train 64. A spring 58 is also connected to the mirror structure 34 for assisting in the movement of the mirror 34.

The preferred type of micro-actuator device for use in the MEMS shutter array 30 is an electrothermal actuator 70. Referring to FIG. 6, the mirror 34 is attached to one end of a mechanical slider 72. In order to actuate the mirror 34 between an open shutter and closed shutter position, two or more thermal actuators 74 are positioned at the opposite end of the mechanical slider 72. Each thermal actuator 74 is constructed having two arms 76 formed into a U-shaped asymmetrical microstructure. Because the cross-sectional areas of the arms 76 are different, the electrical resistance varies between the arms. In operation, a current is applied across the arms 76 of the thermal actuator 74. The unequal expansion of the structure causes a lateral movement of the actuator 74. In this way, the mirror 34 is actuated to an open shutter position. Reference is made to U.S. Provisional patent application No. (Corning Attorney Docket No.: Pai P14858) for a more detailed explanation of a similar electrothermal actuator; the disclosure thereof being incorporated herein by reference as though fully set forth in its entirety.

It will be apparent to those skilled in the art that various modifications and adaptations can be made to the present invention without departing from the spirit and scope of the invention. Thus, it is intended that the present invention cover the modifications and adaptations of this invention, provided they come within the scope of the appended claims and their equivalents.

What is claimed is:

1. An optical switch having two dispersive elements for selectively switching wavelength channels between two optical signals, each of the two dispersive elements receiving an optical input signal and dispersing the optical input signal into a plurality of wavelength-separated input channels, the optical switch comprising:

a micro-electro mechanical shutter array for receiving the plurality of wavelength-separated input channels from each of the two dispersive elements, the micro-electro mechanical shutter operative for selectively switching one or more of the plurality of wavelength-separated input channels between the two optical signals.

2. The optical switch of claim 1 wherein the micro-electro mechanical shutter array includes a movable switching element for each of the wavelength-separated input channels, the movable switching element receiving an input beam from each of the two dispersive elements, the input beam corresponding to one of the plurality of wavelength-separated input channels.

3. The optical switch of claim 2 wherein the movable switching element is selectively movable between an open position and a closed position, whereby the movable switching element passes the input beam from one of the plurality of wavelength-separated input channels to a first output channel when in an open position and reflects the input beam to a second output channel when in a closed position.

4. The optical switch of claim 3 wherein the movable switching element includes a reflecting member and an actuator.

5. The optical switch of claim 4 wherein the reflecting member is a MEMS movable mirror.

6. The optical switch of claim 4 wherein the actuator is selected from a group consisting of a thermal actuator, an electro-static actuator, a comb drive actuator, or a scratch drive actuator.

7. The optical switch of claim 1 further comprising:
a focusing lens positioned between the micro-electro mechanical shutter array and the two dispersive elements.

8. The optical switch of claim 1 wherein the optical input signals have different polarization components, the optical switch further comprising:
a polarization dispersive element for spatially separating the different polarization components of each of the optical input signals.

9. An optical switch for selectively switching wavelength channels between two optical signals comprising:
a first dispersive element receiving a first optical input signal and dispersing the first optical input signal into a plurality of first wavelength-separated input channels;
a first focusing lens receiving the plurality of first wavelength-separated input channels;
a second dispersive element receiving a second optical input signal and dispersing the second optical signal into a plurality of second wavelength-separated input channels;
a second focusing lens receiving the plurality of second wavelength-separated input channels; and
a switching array mechanism between the first focusing element and the second focusing element for selectively switching the wavelength-separated input channels between the first optical input signal and second optical input signal.

10. The optical switch of claim 9 wherein the first dispersive element and the second dispersive element each comprise:
a diffraction grating.

11. The optical switch of claim 9 wherein the first focusing lens and the second focusing lens each have a focal length, the first focusing lens and the second focusing lens being positioned a distance away from the switching array mechanism substantially equal to the focal length.

12. The optical switch of claim 9 wherein the switching array mechanism comprises:
a micro-electro mechanical shutter array.

13. The optical switch of claim 9 wherein the switching array mechanism includes a movable switching element for each of the wavelength-separated input channels, the movable switching element selectively movable between an open position and a closed position such that the movable switching element passes an input beam from one of the plurality of wavelength-separated input channels to a first output channel in an open position and reflects the input beam to a second output channel in a closed position.

14. The optical switch of claim 13 wherein the movable switching elements includes a reflecting member and an actuator.

15. The optical switch of claim 14 wherein the reflecting member is a MEMS movable mirror.

16. The optical switch of claim 14 wherein the actuator is selected from a group consisting of a thermal actuator, an electro-static actuator, a comb drive actuator, or a scratch drive actuator.

17. The optical switch of claim 9 wherein the optical input signals have different polarization components, the optical switch further comprising:
a polarization dispersive element positioned prior to the first dispersive element for spatially separating the different polarization components of the first optical input signal.

* * * * *